United States Patent [19]

Boede et al.

[11] Patent Number: 4,933,809
[45] Date of Patent: Jun. 12, 1990

[54] ELECTRICAL COMPONENT ASSEMBLY FOR AN OUTBOARD MOTOR

[75] Inventors: Robert H. Boede, Omro; James R. Walsh, Oshkosh; William J. Kaska, Fond du Lac, all of Wis.

[73] Assignee: Brunswick Corporation, Skokie, Ill.

[21] Appl. No.: 218,706

[22] Filed: Jul. 13, 1988

[51] Int. Cl.⁵ ............................................ H05K 1/14
[52] U.S. Cl. ................................. 361/395; 361/356; 361/394; 440/77
[58] Field of Search ............... 174/50, 50.5, 50.51, 174/52 R, 35 GC; 361/33, 334, 346–347, 356–357, 392–395, 399, 417, 419–420, 424, 428; 440/76, 77

[56] References Cited

U.S. PATENT DOCUMENTS

| 2,014,272 | 9/1935 | Blomquist | 361/334 |
| 2,462,489 | 2/1949 | Hallett | 361/424 |
| 2,462,491 | 2/1949 | Hallett | 361/424 |
| 4,396,795 | 8/1983 | Bogner | 174/35 GC |
| 4,632,662 | 12/1986 | Handa | 361/383 |

Primary Examiner—Gregory D. Thompson
Attorney, Agent, or Firm—Andrus, Sceales, Starke & Sawall

[57] ABSTRACT

A modular assembly of diverse electrical components for operation of an outboard motor including a box in which the components are inserted and/or mounted and prewired. External leads are organized for passage through a few specially located openings in the box for external connection. The fully assembled and prewired assembly is enclosed with a demountable cover and attached directly to the engine block. The modular assembly alleviates indiscriminate component mounting and corresponding disarray of interconnecting lead wires. In addition the moisture and corrosion resistance of the components is enhanced.

3 Claims, 2 Drawing Sheets

ELECTRICAL COMPONENT ASSEMBLY FOR AN OUTBOARD MOTOR

BACKGROUND OF THE INVENTION

The present invention relates to the packaging and mounting of electrical control components on an outboard motor and, more particularly, to an engine-mounted modular assembly for such components.

The electrical system for an internal combustion engine-driven outboard motor includes a wide variety of diverse electrical control components. For reasons of convenience, most of these control components are preferably mounted on or closely adjacent the engine. Operating power for the electrical system and to charge the battery is generated by a permanent magnet alternator incorporated into the engine flywheel and other components utilized in the direct control of engine operation, such as the voltage regulator and spark ignition system, are most conveniently located in close proximity to the alternator and the engine.

It has been typical in the outboard motor industry to mount the various electrical control components individually, wherever space on or near the engine could be found. As a result, the location of various components is often far from optimum with respect to the orientation and length of electrical leads to and from the components. Thus, final assembly often results in a maze of interconnecting wires which is not only unsightly, but makes location, testing and servicing of the components difficult. The unsightly appearance is often overlooked, because the engine and attached components are ultimately enclosed in a cowl. However, the functional problems associated with indiscriminate mounting and wiring remain a significant problem.

Many of the electrical control components are also subject to high corrosion and/or their performance is adversely affected if they get wet. Obviously, the environment in which an outboard motor is operated is highly conducive to corrosion and moisture problems. Although the engine housing or cowl provides some protection, most engine mounted electrical components are still subject to corrosive attack as well as the possibility of becoming damp or wet.

Some attempt has been made to overcome the problems with the location and mounting of electrical components on an outboard motor engine. It is known to attach a substantially flat base plate to the engine and to mount various electrical components on the base plate. A flat cover plate may be placed over the components and attached to the base plate, but the sides are left completely open and the external leads enter the assembly all around the peripheral edge. Although some order to the assembly is provided, external leads still extend in indiscriminate fashion and little, if any, protection against corrosion and water is provided.

Conflicting design philosophies make it problematic as to whether or not absolute protection against moisture for electrical components can or should be provided. One philosophy is that absolute water tightness would be difficult and expensive to provide. Another philosophy is that enhanced moisture protection and some level of water tightness is desirable, but some means for the draining or removal of water which might reach the components (e.g. if the engine is swamped) must be provided. Nevertheless, prior art electrical component packaging has clearly not adequately addressed the problems of corrosion and moisture attack, nor the inefficiencies and functional problems with indiscriminate component placement, intercomponent wiring and lead connections.

SUMMARY OF THE INVENTION

The present invention provides a modular assembly for engine electrical components which overcomes the problems associated with indiscriminate mounting and wiring of individual components and enhances the protection of the components against corrosion and moisture damage.

The modular electrical component assembly includes a component box adapted to be attached to the engine and including internal attachment means for the orderly receipt and positioning of the various diverse electrical components. Means are also provided within the box for intercomponent connection and for connection of the external input/output leads supplying power or electrical signals to or from the assembly.

The component box is configured to utilize a few openings in the walls of the box to accommodate passage of all the external leads. The box of assembled and interconnected components is closed with a moisture resistant cover and the assembled box and cover are mounted directly on the engine.

Certain of the external lead openings in the box may be adapted to accommodate multiple leads and others may be provided with sealing means to provide a moisture resistant seal between the lead and the opening in the box.

Preferably, the completely assembled and enclosed modular unit is attached to the engine such that the only remaining connections are made externally of the assembly. The cover is, however, removable for subsequent servicing of the components within the box.

The box is preferably made of diecast aluminum, commonly used in outboard motors because of its light weight and corrosion resistance. The cover is preferably of a molded plastic construction.

DETAILED DESCRIPTION OF THE PREFERRED EMBODIMENT

Figure 1:
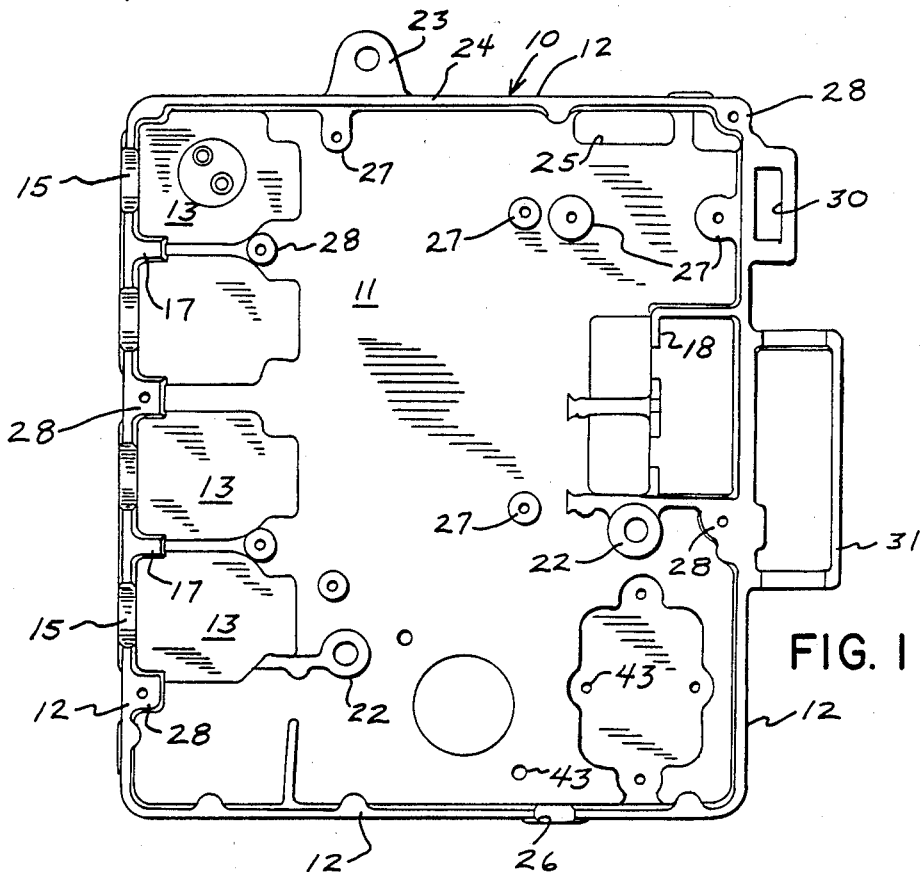
FIG. 1 is a plan view of the open box used to hold the electrical components in the modular assembly of the present invention.

A component box 10, as best shown in FIG. 1, includes a generally flat bottom wall 11 and integral upstanding side walls 12. The box 10 is preferably die cast of aluminum, but other suitable materials may also be used. The box is specially configured for receipt of various diverse electrical components which are used in the control of operation of an outboard motor. The box may, for example, be especially constructed for a particular type or size of outboard motor and include space for receiving all of the required electrical components if the motor is configured with all of its accessory equipment utilizing electrical control. Control components in motors of the relavent type or size which are configured without certain accessory equipment may simply be eliminated from the box.

Figure 2:
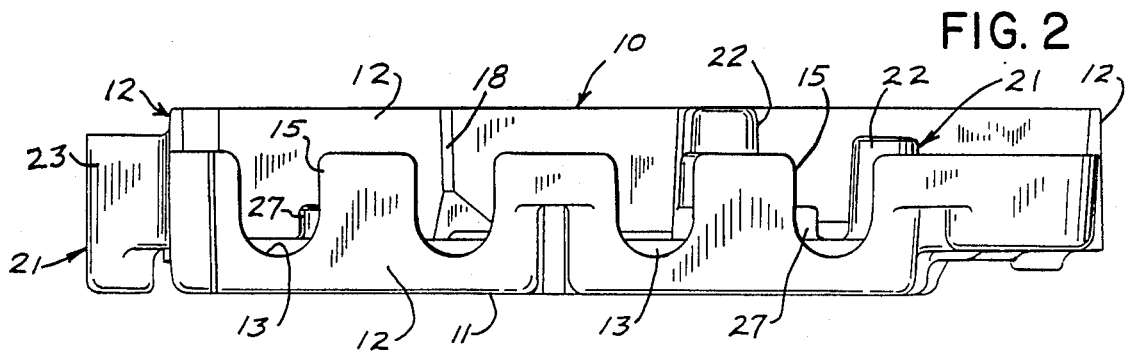
FIG. 2 is a side elevation of the box shown in FIG. 1.
Figure 3:
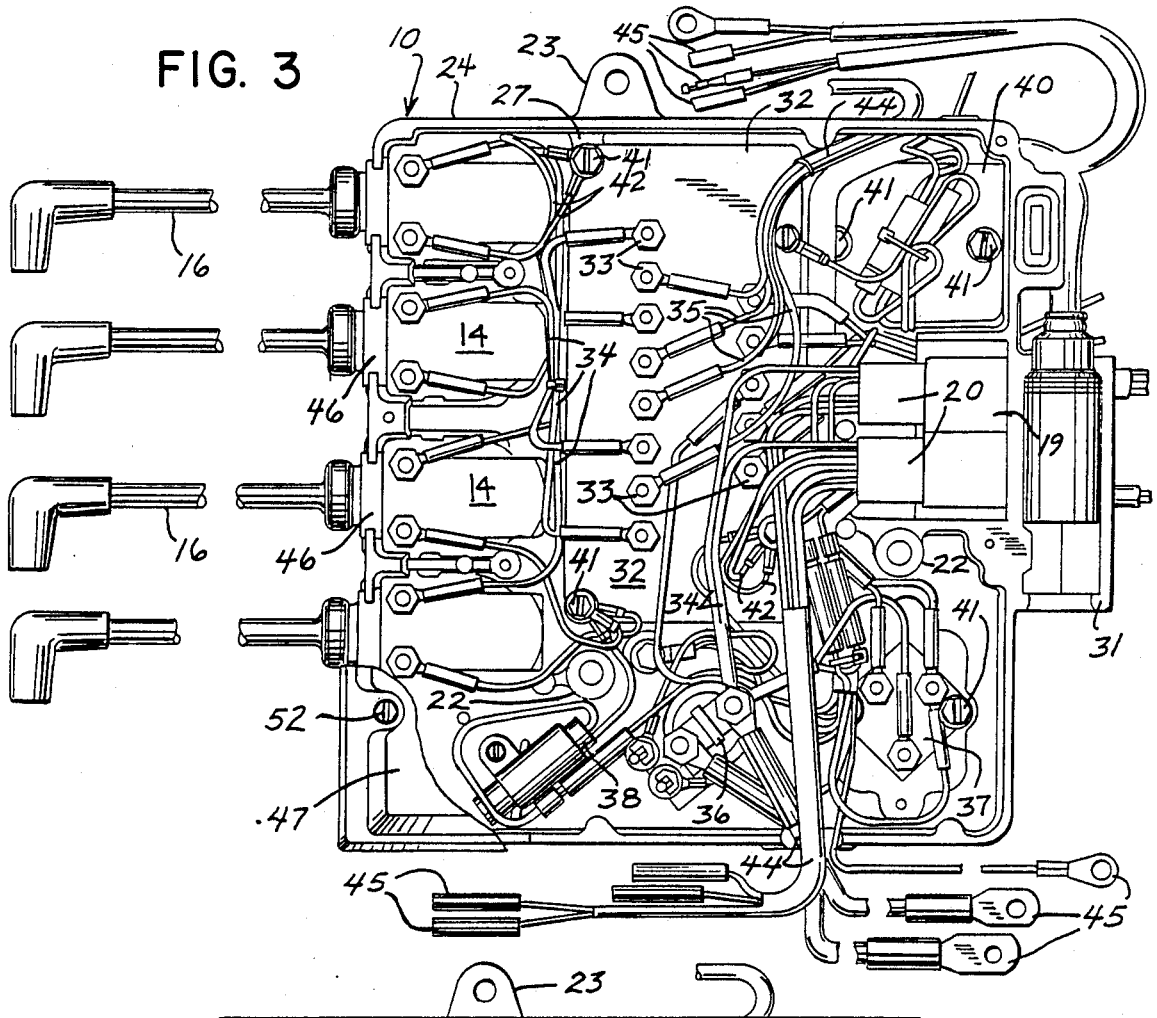
FIG. 3 is a plan view similar to FIG. 1, but showing the interconnected electrical components mounted in the box and the external component leads extending through the walls thereof.

Thus, as shown in FIG. 2, the box 10 may include first recessed portions 13 in the bottom wall 11 adjacent one of the side walls 12. The first recessed portions are specially sized and shaped to receive an ignition coil assembly 14 shown in FIG. 3. In the side wall 12 adjacent each of the recessed portions 13 is a generally U-shaped slot 15 for receipt of the external lead comprising a high tension spark plug cable 16, as also shown in FIG. 3. Between adjacent U-shaped slots 15, a short separator flange 17 forming an integral inward extension of the side wall 12 helps to separate and position the ignition coils placed in the recessed portions 13.

The box 10 may also include special provision for the receipt of other diverse electrical control components. For example, adjacent the side wall 12 opposite the first recessed portions 13, a rectangular enclosure 18 is adapted to receive a trim control module 19 and associated power trim harness plugs 20, as are shown in FIG. 3. Other types of electrical components providing a number of control functions are similarly placed in the box, some of which are positioned by integral structural portions of the box and others of which may be securely fastened, as with mounting screws, in a manner to be described in more detail hereinafter.

The box also includes three integral box mounting bosses 21. Two of the mounting bosses 22 are located on the interior of the box and extend upwardly from the bottom wall 11. The other mounting boss 23 comprises an integral exterior extension of one side wall 24, which ultimately is located as the top wall of the assembly when it is attached to the engine.

In the bottom wall 11 of the box immediately adjacent the one side wall 24 is an open rectangular slot. In the side wall opposite said one wall 24, a second generally U-shaped slot 26 is provided similar to the U-shaped slots 15 adjacent the first recessed portions 13.

A number of integral component and cover mounting bosses 27 and 28, respectively, extend upwardly from the bottom wall 11 and are of varying heights above the bottom wall, depending on the component mounting function they are intended to serve.

On the outside of the side wall 12 adjacent the trim control enclosure 18, the box may include an integral fuse mount 30 and a wiring harness cradle 31.

Referring particularly to FIG. 3, a large switchbox assembly 32 is mounted in the center top portion of the box generally between the ignition coils 14 and the trim control module 19. The switch box includes the series of connecting terminals 33 to which a variety of intercomponent connections 34 and external component lead connections 35 are made.

Some of the other diverse electrical components in the specific modular assembly shown include an electric starter solenoid 36, a rectifier assembly 37, a switch and fuse assembly 38, and an oil warning system assembly 40. Other engine types and/or sizes may include additional or different components and certain engines within a particular type or class may not utilize all of the components. For example, the starter solenoid 36 and rectifier assembly 37 would be omitted in outboard motors with manual start. Similarly, the trim control module 19 and associated harness plugs 20 would be eliminated if a power trim option is not provided on the outboard motor.

As indicated previously, some of the electrical components may be securely attached to the box 10 with suitable demountable fasteners. For example, the switch box assembly 32 may be attached to the underlying component mounting bosses 27 with mounting screws 41. One or more of the component mounting screws 41 may also be used to attach the end connector of one or more ground leads 42. Other components, such as the rectifier assembly 37, may be attached directly to the bottom wall 11 of the box via mounting screws 41 secured in suitably tapped holes 43 in the bottom wall.

To minimize the total number of external lead connections 35 to and from the assembly, both to help eliminate functional disarray and to improve appearance, the external leads are grouped where possible and convenient into conduits 44 each of which may carry several or more wires. Externally of the box, the wires may be provided with suitable terminations 45 of various kinds for attachment to other engine components. Several multi-wire conduits 44 are run through either the rectangular slot 25 or the second U-shaped slot 26 in the bottom and side wall of the box, respectively. The connections between each of the spark plug cables 16 and its associated coil assembly 14 may include a sealing grommet 46 which seats and seals the assembly in the U-shaped slot 15. Although similar sealing means may be provided for the interface between the conduits 44 and either the rectangular slot 25 or the U-shaped slot 26 through which they pass, this is not normally necessary because a water tight and moisture proof assembly is usually not intended or required.

Figure 5:
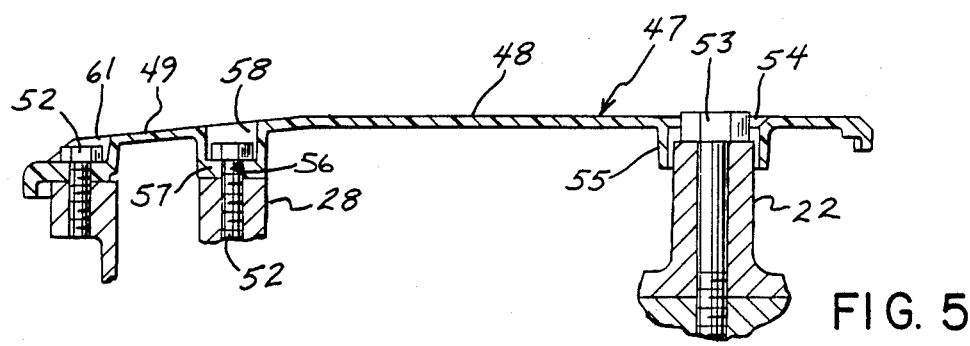
FIG. 5 is a sectional view taken online 5—5 of FIG. 4 with the electrical components omitted to show details of the box and cover construction.
Figure 4:
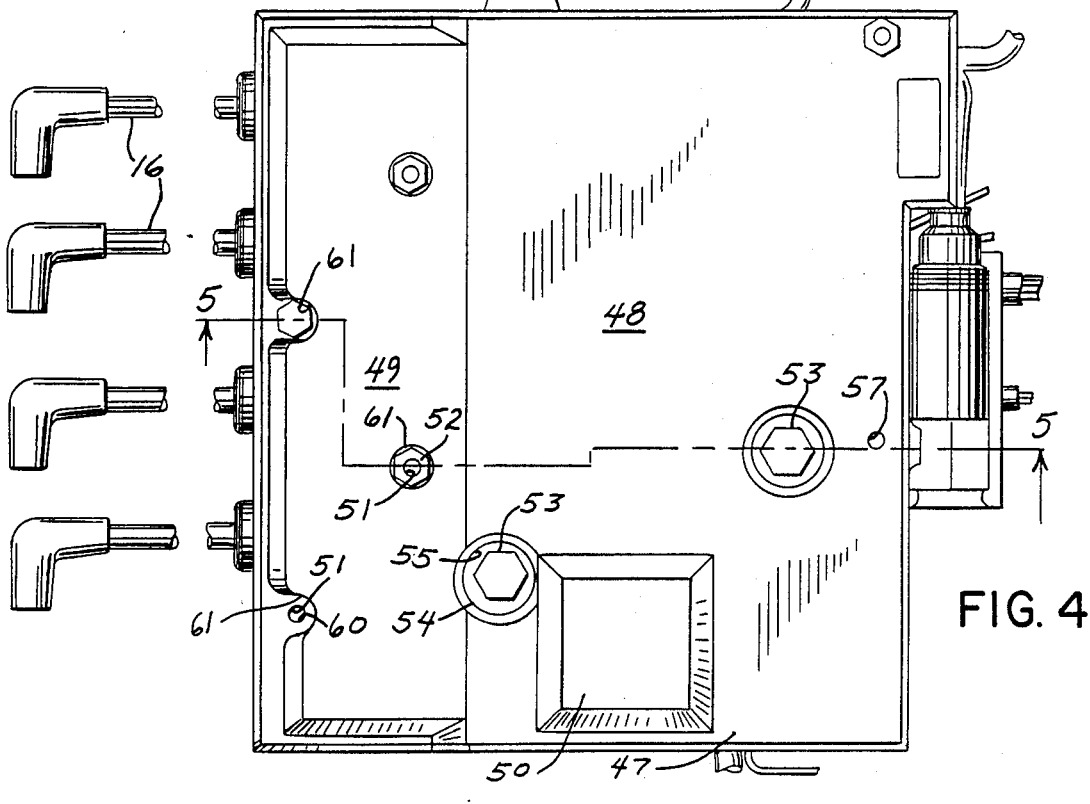
FIG. 4 is a plan view of the modular assembly with the cover attached thereto and the entire assembly mounted to the engine.

After all of the various diverse electrical components are inserted and, if necessary fastened in the box, and all of the intercomponent and external lead connections 34 and 35 are made, the box 10 is closed with a cover 47 as shown in FIGS. 4 and 5. The cover includes a generally flat center portion 48 which, in the embodiment shown, includes a raised portion 50 adjacent one edge to accommodate the extended height of the starter solenoid assembly 36. The portion 50 of the cover 47 intended to overlie the ignition coil assemblies 14 tapers downward slightly to closely overlie the upper surfaces of the coil assemblies and help hold them in position within the box. The cover also includes a number of mounting holes 51 positioned to overlie the cover mounting bosses 28 on the box for receipt of suitable cover mounting screws 52. The cover mounting holes 56 on the interior surface of the cover are recessed and each includes a bottom flange 57, the underside of which bears on the top of an interior cover mounting boss 28 as the mounting screw 52 or bolt is threaded into the boss. The recess 58 eliminates mounting bolt head protrusion above the surface of the cover. Similarly, the cover mounting holes 60 on the edge of the cover 47 are located in U-shaped recesses 61 to suitably recess the heads of the mounting screws 52. The edge of the cover is adapted to rest on the edges of the side walls 12 and, except for possible small gaps created by the U-shaped slots 15 and 26, provide a continuous moisture resistant seal along the enclosing interface.

After the cover is secured to the box, the modular assembly is mounted on the engine, via mounting bolts 53 extending through the holes in the mounting bosses 21 and into suitably tapped holes in the engine block. The cover 47 includes a pair of mounting bolt openings 54 which overlie and are aligned with the interior mounting bosses 22. A sleeve 55 integral with the cover and depending downwardly from the underside thereof terminates in an edge surrounding and closely spaced from the upper end of the boss 22. In this manner, the modular assembly may be attached to the engine after complete assembly including attachment of the cover thereto, and may be subsequently detached if necessary without removal of the cover. More importantly, because the mounting bolt heads bear directly on the mounting bosses 22 and clear the bolt openings 54 in the cover, the cover may be readily removed from the box to service the components inside after the box has been mounted to the engine. The third mounting bolt 53 extends through the hole in the exterior boss 23 for receipt in a suitable tapped hole in the engine block.

The modular assembly of the present invention provides substantially enhanced moisture resistance for the internal components over the methods and apparatus used in the prior art. Enhanced moisture resistance and/or protection against the ingress of water may be provided with suitable grommets 46, wherever external leads or conduits 44 pass through the walls 11 or 12. Likewise, a suitable gasket may be interposed between the edge of the cover 47 and the edges of the side walls 12 to which it is attached. In addition, all of the various diverse electrical components may be preassembled in the box, internally interconnected or attached to suitable external leads, and the entire assembled module subsequently mounted to the engine. The disarray of wires characteristic of prior art assemblies is substantially eliminated and, in many cases, substantially shorter interconnecting wires and leads may be utilized.

Various modes of carrying out the present invention are contemplated as being within the scope of the following claims particularly pointing out and distinctly claiming the subject matter which is regarded as the invention.

We claim:

1. A modular assembly for diverse engine-mounted electrical control components of varying size, shape and function in an outboard motor comprising:
   a component receiving box adapted to be attached to the engine, said box including a bottom wall and peripheral walls, said bottom wall adapted to be positioned adjacent to the engine;
   containment means in the box for receipt of said diverse components;
   a component connection switchbox within the box for providing intercomponent connections and external lead connections;
   lead openings in the walls of the box to accommodate passage therethrough of the external lead connections;
   cover means for enclosing said box and providing a moisture resistant seal along the enclosing interface;
   mounting means for mounting the box and cover to the engine, said mounting means comprising mounting bolts interconnecting the bottom wall of the box and the engine; and,
   access holes in the cover means surrounding said mounting bolts, said access holes adapted to provide access to the mounting bolts to allow mounting of the assembly to the engine after attachment of the cover means and subsequent removal of said cover means from the mounted assembly.

2. The assembly as set forth in claim 1 wherein the cover means comprises a cover and demountable fasteners interconnecting the cover and the box.

3. A modular assembly of diverse electrical components for controlling the operation of an outboard motor including an internal combustion engine, said assembly comprising:
   a component receiving box adapted to be attached to the engine, said box having integral side and bottom walls and an open top;
   an array of diverse electrical components, including engine control components and outboard motor accessory control components, and intercomponent electrical connections and external lead connections assembled in said box;
   a component switchbox mounted in said box including a connecting terminal array for said intercomponent connections and said external lead connections;
   lead openings in the walls of the box to accommodate passage therethrough of said external lead connections;
   a cover demountably attached to said box to substantially close said box;
   mounting bolts attaching the bottom wall of said box to the engine; and,
   access holes in the cover aligned with said mounting bolts to provide access to said bolts for mounting the assembled box and cover to the engine after attachment of said cover to said box.

* * * * *